(No Model.) 2 Sheets—Sheet 2.

F. HEINTZ.
GLASS MELTING FURNACE AND REGENERATOR.

No. 362,961. Patented May 17, 1887.

Witnesses
Chas. J. Williamson,
L. L. Miller.

Inventor
Friteof Heintz.
By his Attorney Chas. H. Fowler

UNITED STATES PATENT OFFICE.

FRITIOF HEINTZ, OF ROCK ISLAND, ILLINOIS.

GLASS-MELTING FURNACE AND REGENERATOR.

SPECIFICATION forming part of Letters Patent No. 362,961, dated May 17, 1887.

Application filed June 10, 1886. Serial No. 204,768. (No model.)

*To all whom it may concern:*

Be it known that I, FRITIOF HEINTZ, a citizen of the United States, residing at Rock Island, in the county of Rock Island and State of Illinois, have invented certain new and useful Improvements in Glass-Smelting Furnaces and Regenerators; and I do hereby declare that the following is a full, clear, and exact description of the same, reference being had to the annexed drawings, making a part of this specification, and to the letters and figures of reference marked thereon.

My invention relates to improvements in furnaces for melting glass, and belongs to that class in which the gas is highly heated before it comes in contact with the air which supports combustion.

The object of my invention is to provide a cheap and reliable tank-furnace for melting glass, in which gas is used as a fuel, said furnace belonging to the well-known type of regenerator gas-furnaces.

My invention consists in placing bricks in the regenerator-chamber which increase in length from the point where the gas enters said chamber to the opposite side of the chamber, so as to arrest the gas as it enters the chamber and distribute it equally to the flue through which it enters the combustion-chamber.

Figure 1:
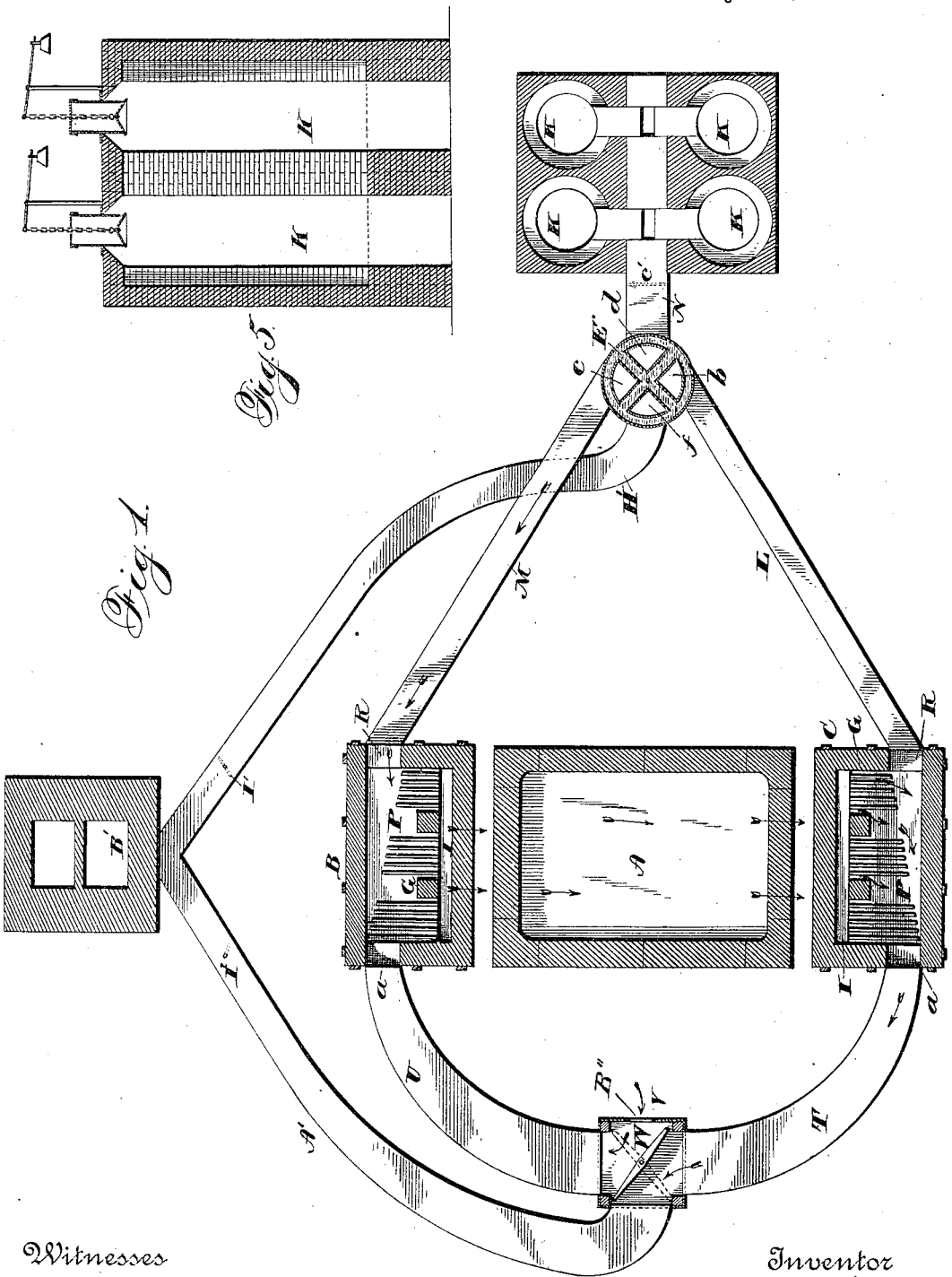
Figure 2:
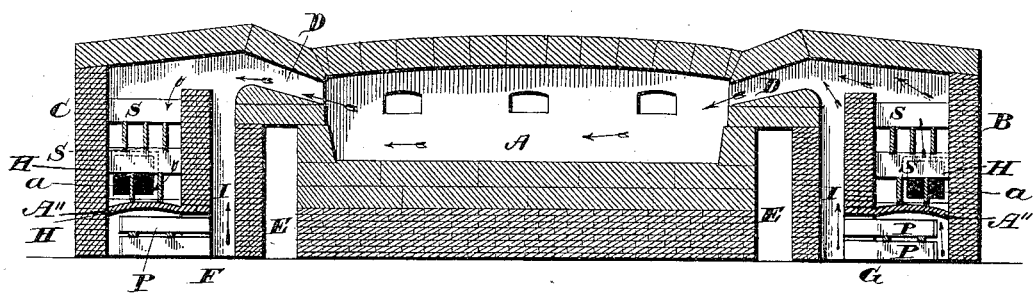
Figure 3:
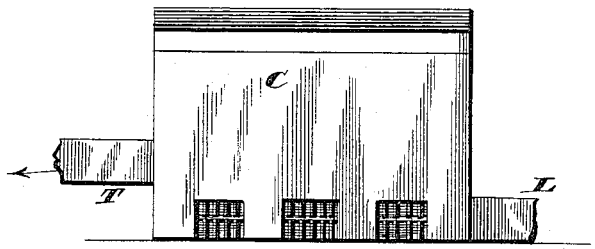
Figure 4:
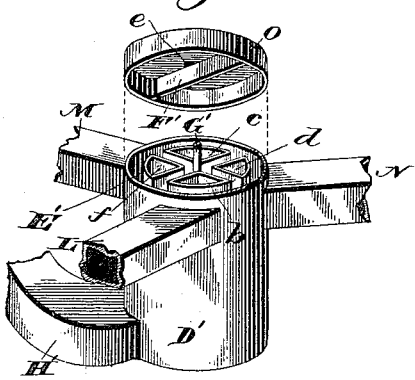

Figure 1 is a sectional plan view of the melting-chamber, regenerators, producer, stack, and valves and a plan view of the air and gas flues. Fig. 2 is a longitudinal sectional view of the melting-chamber and the regenerators arranged at each end. Fig. 3 is an end view of one of the regenerators, showing the gas-flue and the flue through which the waste products of combustion pass. Fig. 4 is a view in perspective of the reversing-valve which controls the direction of the gas as it passes from the producer to the regenerator. Fig. 5 is a vertical sectional view of the producers.

A indicates the melting-tank or combustion-chamber in which the material to be melted is placed, said tank or chamber being lined with fire-brick or other refractory material. This tank or chamber is, by preference, made shallow and of any suitable length, so that the material placed therein will be exposed in all parts to the heat of the burning gases and a quick melt insured.

B and C are chambers located at each end of the combustion-chamber A, but connected thereto at the top by the flues D; or, instead of continuous flues, a series of ports may be used, as is common in this class of furnaces.

The melting-tank is separated from the chambers B and C by means of the open spaces E, which serve to keep the walls of the melting-tank cool, and thus protect the same from excessive heat.

The chambers B and C are provided with division-walls F and G, which divide them into two compartments, H and I, the former being the air-regenerating chambers and the latter the flues or chambers through which the gas is admitted to mingle with the air and effect a complete combustion.

K are the gas producers or generators, located at any suitable or convenient point with relation to the furnace or melting-tank A, and is connected to the regenerator-chambers H H by means of the flues L and M, said flues entering said chambers at or near the bottom thereof, as shown at L, Fig. 3.

The flues L and M connect with the main flue N, leading from the producers K, said flue N being provided with a two-way valve, O, for directing the flow of gas either into the flue L or M, as occasion may require.

P are a series of deflectors or stops, located below and separated from the regenerator-bricks by the partition A″. These stops or deflectors gradually increase in length from the gas-port R to the other side of the chamber, and are for the purpose of checking the volume of gas and directing it into the flue I. This is a very essential point in my invention, as the currents of gas are broken up and distributed to the flue I and to the melting or combustion chamber in a uniform body, and meet with the heated air which comes through the regenerator-brick in the flue D.

As before stated, S indicates the checker-brick, which are built up in the usual manner, and are separated from the deflecting-brick P by a wall or partition, A″, said checker-brick being of any of the well-known forms and made of the best fire-clay.

T and U are flues leading from the exit-ports *a* of the regenerator-chambers H to the valve-box V, said box being provided with a valve for reversing the direction of the products of combustion and permitting them to escape to the flue A', and from thence into the stack B', said box V being also provided with an opening, B'', through which atmospheric air is admitted to the regenerator on the operating or burning side of the furnace.

In practice we will suppose that the valve O is turned so as to admit of the gases passing through the flue M and through the deflecting-brick into the flue I, which, meeting with the air-current from the regenerator, causes combustion to take place within the melting-chamber A, the waste products of combustion passing over into the chamber C, and thence through the flues T and A' into the stack B'. The passage of the waste products of combustion through the checker-brick in the chamber heats the same, so that when the valve O is reversed to bring the gas through the flue L into the chamber on the other side, and the valve W turned so as to bring the waste products of combustion through the flue U, the air will be heated to a high degree, and when it meets with the gas a perfect combustion of the gases is the result.

The flue N, leading from the producers to the valve O, is provided with a valve, C', by which the supply of gas admitted to the regenerators is regulated, and, as before intimated, the direction of the gases is controlled by the valve O, which will now be described.

The flues L, M, and N enter the valve-chamber D', and terminate in quadrant-shaped extensions b, c, and d, respectively, around which is formed a water-space, E', and through which a current of water is kept running from any suitable source.

O is the valve, which is in the form of a lid, for the chamber D', said valve being provided with a division-plate, F', and an aperture, e, to receive the guide-rod or standard G'. When it is desired to direct the gas from the flue N to the flue M, the valve O is arranged so as to allow the division-plate to enter between the quadrant-shaped extensions b and d. This will cause the gas entering from the flue N through the extension d to pass into the extension c and into the flue M; and when it is desired to change the flow of gas through the flue L the lid or valve O is turned around, so that the division-plate F' will enter between the extensions d and c, and thus put the extensions d and b in communication, and in this manner the gas can be directed either into the flues M or L.

It is necessary in this class of furnaces that when the gas is entering the regenerators at one end of the furnace, and being consumed there, that the regenerator-chamber at the other end of the furnace should be kept free from gas, and in order to prevent any waste or escaping gas from entering the flue L while the flues N and M are in communication the waste or escaping gas is drawn down through the extension f of the flue H', and thence to the stack B'.

The flues A' and H' are provided with suitable dampers, I', by which the draft to the stack is regulated.

Having thus described my invention, I claim—

1. A furnace for melting glass and other material, of the character described, provided with gas-flues having deflectors, which increase in length from the port of entry to the opposite side of the chamber, whereby the gas is arrested and directed into the ports in a uniform column, as set forth.

2. A furnace for melting glass and other material, having gas-regenerator chambers at each end and a chamber, located below the regenerator chambers, provided with the deflectors of unequal length, in combination with the gas-controlling valve, as set forth.

3. In a furnace for melting glass and other material, a gas-regenerator chamber at each end thereof and chambers located below the gas-regenerator chambers, having deflectors of unequal length, in combination with a reversing-valve consisting of a cap provided with partitions, and the water-spaces and extensions of flues, substantially as and for the purpose set forth.

In testimony that I claim the above I have hereunto subscribed my name in the presence of two witnesses.

FRITIOF HEINTZ.

Witnesses:
OLIVER OLSEN,
C. L. McLAY.